Nov. 25, 1930.  C. DE VINNA  1,782,529
FILM MAGAZINE LOCKING DEVICE
Filed Aug. 20, 1928
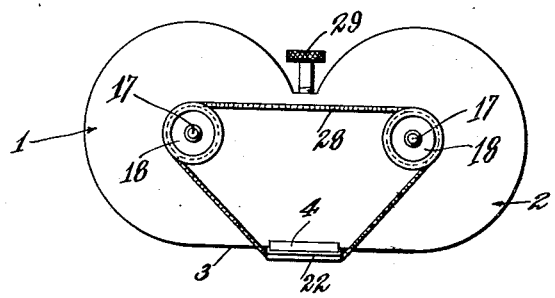
Fig.1.
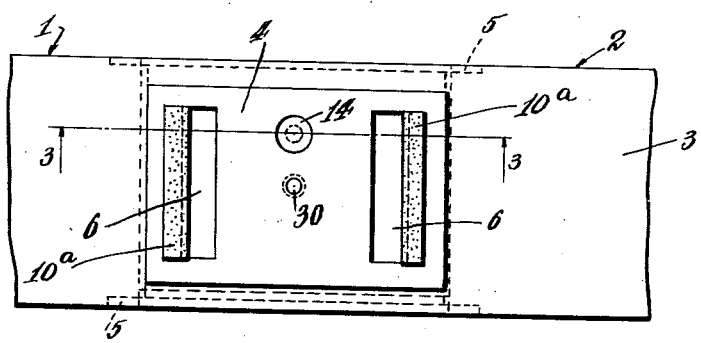
Fig.2.
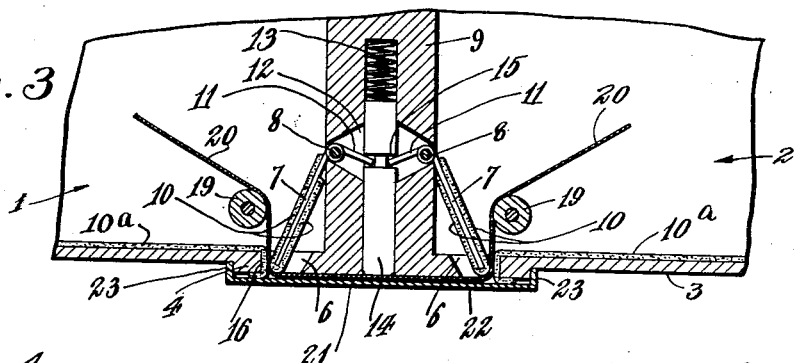
Fig.3
Fig.4.
Fig.5.
Inventor
Clyde De Vinna
By Lyon & Lyon
Attorneys Patented Nov. 25, 1930

1,782,529

UNITED STATES PATENT OFFICE

CLYDE DE VINNA, OF LOS ANGELES, CALIFORNIA, ASSIGNOR TO METRO-GOLDWYN-MAYER CORPORATION, OF CULVER CITY, CALIFORNIA, A CORPORATION OF NEW YORK

FILM-MAGAZINE-LOCKING DEVICE

Application filed August 20, 1928. Serial No. 300,703.

This invention relates to a simple, efficient device for preventing film, particularly continuous film, from being fogged and damaged by exposure or by abrasion while in camera magazines.

An object of this invention is to provide a device capable of preventing false exposure or fogging of undeveloped film while in the magazine.

Another object is to provide a device capable of preventing undeveloped motion picture film from being marred or abraded while in a magazine.

Another object is to provide a device adapted to prevent light from entering a film magazine through film apertures therein and simultaneously maintaining the film in said magazine from becoming loose or abraded.

Another object of this invention is to provide a device capable of preventing film from becoming disengaged from the hubs while in a film magazine.

Other objects, advantages, uses and functions of the device embraced by this invention will become apparent from the following detailed description of a preferred form thereof and of the various modifications which may be made therein, reference being made to the appended drawings, in which:

Figure 1 is a side elevation of a motion picture camera magazine with the device embraced by this invention applied thereto.

Figure 2 is an enlarged inverted plan view of the base portion of a motion picture camera magazine.

Figure 3 is a cross section of the base portion of a motion picture camera film magazine taken along the line 3—3 of Figure 2.

Figure 4 is a perspective view of one form of device embraced by this invention, a portion of such device being broken away.

Figure 5 is a plan view of a modified form of device.

Referring to the drawings, Figure 1 illustrates a customary form of motion picture camera magazine consisting, in general, of two connected circular housings 1 and 2 which thereby form a unitary body provided with chambers adapted to receive a predetermined length of continuous motion picture film.

The two chambers are generally provided with screwed cover plates which may be removed whenever a new length of film is to be introduced into the magazine or whenever the exposed film is to be removed. The base 3 of the magazine is provided with suitably shaped matching grooves or bosses which correspond to the grooves constructed on the top of the camera with which such magazines are to be associated, the purpose of such grooves being to form a light-proof mortised joint.

As shown in Figures 2 and 3, the base plate 3 is provided with a boss 4 and grooves 5 are provided in the sides of the magazine and extend in a line parallel to the base 3 at a short distance therefrom.

The boss 4 made in the face of the base plate 3 is provided with film apertures 6 in which light valves are generally provided. As shown in Figure 3, the light valves may comprise a member 7 pivoted on a pin 8 adjoining or in the partition 9 which separates compartments 1 and 2 of a film magazine. The member 7 may be covered with a non-actinic, soft material, such as velvet 10, so as to prevent scratching of the film when such member comes in contact therewith. The interior of the compartments 1 and 2 may also be covered with a non-actinic, soft substance, such as the velvet 10$^a$, which may extend into the apertures 6, as shown. The member 7 is also connected to a shorter member 11 which extends into the partition 9, particularly into an opening 12 made in said partition.

Members 7 and 11 are rigidly connected together so as to form a pivoted lever. Centrally in the partition 9 an opening communicating with the face of the base plate 3 is formed, adapted to receive a spring 13 and a piston member 14. The piston member 14 may be provided with an annular groove 15 which engages and receives the end of the lever 11. Ordinarily, the pressure of the spring 13 forces the member 14 outwardly, thereby causing the pivoted members 7 and 11 to contact with the velvet lining 10$^a$ on the side 16 of the film aperture 6.

Spindles 17 are centrally disposed in each of the chambers 1 and 2, pulleys 18 being mounted upon the spindles 17 externally of the magazine.

Suitable hubs, not shown, adapted to receive continuous motion picture film are mounted upon the spindles 17 within the chambers 1 and 2. Adjoining the light valves of the film apertures 6 and within the compartments 1 and 2, guide rollers 19 are pivotally mounted so as to guide a strip of film 20 from a hub mounted upon one of the spindles within the magazine with the light valve and through the aperture 6.

Normally a film magazine is loaded by placing a suitable length of film upon a hub within one of the compartments of the magazine, say compartment 2, and then threading the outer end of the film over roller 19 through film aperture 6, then passing the film exteriorly of the magazine as indicated at 21 into compartment 1 through its film aperture 6 and over roller 19 and then connecting the free end of the film with another hub within the compartment 1.

Theoretically, the light valves comprising members 7 within the magazine contact the film 20 with the sides of the aperture 6 so that no light enters the magazine. Actually, however, it is extremely difficult to construct the light valves perfectly, or to assure perfect contact and closure of the film apertures and large quantities of film are very often ruined or impaired by reason of small quantities of light entering the magazine through minute openings between the light valves and the casing of the magazine. Furthermore, whenever film magazines of the character described are shipped or transported as, for example, when a company moves on location, a roll of film mounted upon the hub within the magazine becomes loosened by reason of vibration, sagging or partial rotation of the spindle and hub so that the coiled or wound film separates slightly and allows fine particles of dust or other matter generally present within a film magazine to come between adjoining layers of film and be rubbed into such film, thereby causing scratches and other imperfections.

A further cause of annoyance is caused by the fact that during transportation the leader or free end of the film which has already been wound once or twice upon the hub within the exposed compartment (in distinction to the compartment in which the unexposed film is retained) very often becomes disengaged from the hub so that when the magazine is attached to a camera on location, and said hub rotated by means of a spring belt passed over a pulley, the film will not feed from compartment 2 into compartment 1 and it is then necessary to rewind the leader around the driven hub.

In view of the fact that a dark room may be required for this operation, it is very often necessary to here erect a temporary dark room or send the magazine back to a film laboratory. My device completely eliminates all the difficulties hereinabove described and comprises a flat body portion 22 provided with side edges 23 spaced so as to just cover the boss 4 formed in the base plate 3 of the film magazine. The device also comprises a front edge portion 24 provided with a reentrant edge 25, said reentrant edge being adapted to fit into the groove 5 made in the side of the film magazine. The remaining edge of the device may comprise a flat portion 26 terminating in a tubular portion 27 adapted to receive a continuous spring belt 28.

In operation, after the magazine has been filled with suitable undeveloped film and the film threaded through the film aperture 6 and wound upon the driven hub, the device hereinabove described is clamped upon and in contact with the boss in the base plate of the magazine, the edge 25 entering the groove 5 and the edges 23 covering the edges of the boss 4, thereby completely locking and covering the film apertures 6. The continuous spring belt 28 connected to the device is then passed over pulleys 18 which are mounted upon the spindles 17, the spring belt being of such length that a positive pressure is applied to the pulleys and the belt placed under tension. This locks the device in contact with the film apertures and simultaneously prevents the pulleys 18 from rotating, thereby preventing the film within the magazine from becoming loosened.

A film magazine equipped with this locking device may then be shipped or transported safely with assurance that no light will be admitted into the magazine and that the film will not become loosened, scratched or otherwise damaged during transit.

It will be understood by those skilled in the art that plunger 14 operates the light valves 7 and that after the locking device hereinabove described is removed from the magazine and an additional length of film pulled out, the magazine may be locked into position within a camera, the pin 14 being depressed into its cavity during the locking operation, by engaging with a lug or other pin formed in the camera. This movement of the pin 14 causes the light valves 6 to open, thereby allowing the film to run through the apertures 6 without any resistance.

In addition, the film magazine is locked in contact with the camera by means of locking pin 29 extending through the partition 9 and terminating in a threaded portion which may extend through an opening 30 made in the face of the boss 4 and engage with a suitable internally threaded cavity in the camera proper.

A modified form of locking device is shown in Figure 5 and does not depend upon the use of a spring belt such as the belt 28 shown in Figure 4.

The device shown in Figure 5 also consists of a flat body portion 22 provided with edges 23 and the edges 24 and 25, but instead of a tubular portion 27 this modified form of device is provided with a flat member 31 terminating in tempered spring-like members 33 extending beyond the body 22 of the device. Fastening means 34 may be provided in each of the spring-like members 33 as by punching and curling a portion of the members 33. Any suitable connecting means such as a string, cord, tape, or strap may then be connected to the hooks or other connecting means 34 formed in the members 33, the length of such cord or strap being only sufficient to enable it to be passed over the pulley 18 when the spring members 33 are depressed. Tension in such cord or strap is then maintained by the spring members 33.

Numerous other modifications may be made in the device described herein without departing from the invention and I am not to be limited to the use of any particular material from which the device is to be made, for example, the locking plate may be made of metal, bakelite, pressed paper, or any other suitable composition.

Although preferably such device should be of a non-actinic color, it will be understood that the device may be modified somewhat so as to properly cover and come into engagement with the face plate and film apertures of motion picture camera magazines, depending somewhat upon the modified construction of such magazines.

I claim:

1. A locking device for continuous film magazines comprising, a light proof closure member adapted to cover film apertures in the base plate of a film magazine, said closure member being provided with means for engaging the base plate, and means carried by said closure member adapted to operatively engage with spindles carried by such film magazine and substantially prevent rotation thereof when said closure is engaged with said base plate.

2. A locking device for continuous film magazines comprising, a light proof closure member adapted to cover film apertures in the base plate of a film magazine, and a spring means connected to said closure member and adapted to frictionally engage driving pulleys carried by spindles in said magazine so as to retard rotation thereof.

3. A locking device for continuous film magazines comprising, a light proof closure member adapted to cover film apertures in the base plate of a film magazine, and means carried by said closure member adapted to frictionally engage with and substantially prevent rotation of spindles in said magazine when said closure member is in position over said film apertures.

4. A locking device for motion picture film magazines comprising, a light proof closure member adapted to cover film apertures in the base plate of a film magazine, said closure member being provided with means for engaging the base plate and a continuous spring belt carried by said closure member and adapted to frictionally engage portions of spindles in said magazine.

Signed at Los Angeles, California, this 7th day of August, 1928.

CLYDE DE VINNA.